(12) United States Patent
Plourde et al.

(10) Patent No.: US 9,482,204 B2
(45) Date of Patent: Nov. 1, 2016

(54) ROTOR BLADE FOR VERTICAL AXIS WIND TURBINE

(75) Inventors: Brian Plourde, St. Paul, MN (US); John Abraham, Minneapolis, MN (US)

(73) Assignee: Windstrip LLC, St. Paul, MN (US)

( * ) Notice: Subject to any disclaimer, the term of this patent is extended or adjusted under 35 U.S.C. 154(b) by 852 days.

(21) Appl. No.: 13/700,367

(22) PCT Filed: May 26, 2011

(86) PCT No.: PCT/US2011/038085
§ 371 (c)(1),
(2), (4) Date: Jul. 12, 2013

(87) PCT Pub. No.: WO2011/150171
PCT Pub. Date: Dec. 1, 2011

(65) Prior Publication Data
US 2013/0287591 A1 Oct. 31, 2013

Related U.S. Application Data

(60) Provisional application No. 61/348,945, filed on May 27, 2010, provisional application No. 61/414,662, filed on Nov. 17, 2010, provisional application No. 61/414,658, filed on Nov. 17, 2010.

(51) Int. Cl.
F03D 3/06 (2006.01)

(52) U.S. Cl.
CPC ............... *F03D 3/061* (2013.01); *F03D 3/065* (2013.01); *F05B 2240/213* (2013.01); *Y02E 10/74* (2013.01)

(58) Field of Classification Search
CPC ... F03D 3/061; F03D 3/065; F05B 2240/213
USPC ................................................. 416/231 R
See application file for complete search history.

(56) References Cited

U.S. PATENT DOCUMENTS

| 964,374 A | * | 7/1910 | Bey | F03D 3/00 |
| | | | | 415/18 |
| 1,490,844 A | * | 4/1924 | Kichimatsu | F03D 3/065 |
| | | | | 416/169 R |

(Continued)

FOREIGN PATENT DOCUMENTS

| AU | 620813 | 2/1992 |
| FR | 732018 | 9/1932 |

OTHER PUBLICATIONS

International Search Report and Written Opinion from corresponding International Application No. PCT/US2011/038085, mailed Feb. 14, 2012.

*Primary Examiner* — Ninh H Nguyen
*Assistant Examiner* — Aaron R Eastman
(74) *Attorney, Agent, or Firm* — Westman, Champlin & Koehler, P.A.

(57) ABSTRACT

One embodiment of a rotor blade for a vertical axis wind turbine comprises a central portion having a central axis and at least two blade members. The blade members each have a proximal end attached to the central portion, a high drag side and a low drag side that is opposite the high drag side. Each of the blade members also includes an uncovered vent comprising an opening through the blade member that provides an unobstructed path for airflow through the blade member. In one embodiment, a pair of fins are positioned adjacent the opening of the vent and extend from the high drag side of the blade member.

19 Claims, 6 Drawing Sheets

(56) References Cited

U.S. PATENT DOCUMENTS

| | | | | |
|---|---|---|---|---|
| 3,918,839 A | * | 11/1975 | Blackwell | F03D 3/061 |
| | | | | 416/175 |
| 3,930,750 A | * | 1/1976 | Schultz | F03D 3/065 |
| | | | | 416/197 A |
| 4,037,989 A | * | 7/1977 | Huther | F03D 3/061 |
| | | | | 416/197 A |
| 4,177,009 A | | 12/1979 | Baum, Sr. et al. | |
| 4,350,900 A | | 9/1982 | Baughman | |
| 5,494,407 A | | 2/1996 | Benesh | |
| 6,158,278 A | * | 12/2000 | Klinefelter | F03D 3/065 |
| | | | | 73/170.05 |
| 7,008,171 B1 | | 3/2006 | Whitworth | |
| 7,696,635 B2 | | 4/2010 | Boone | |
| 2004/0057829 A1 | | 3/2004 | Khan | |
| 2004/0083806 A1 | * | 5/2004 | Dahlberg | G01P 5/06 |
| | | | | 73/170.01 |
| 2006/0263198 A1 | * | 11/2006 | Toby Kinkaid | F03D 3/005 |
| | | | | 415/4.2 |
| 2007/0269312 A1 | * | 11/2007 | Hsu | F03D 3/062 |
| | | | | 416/186 R |
| 2008/0106102 A1 | * | 5/2008 | Liao | F03D 3/005 |
| | | | | 290/55 |
| 2009/0155074 A1 | * | 6/2009 | Sankar | F03D 3/005 |
| | | | | 416/44 |
| 2009/0167027 A1 | * | 7/2009 | Kato | F03D 3/02 |
| | | | | 290/55 |
| 2010/0266403 A1 | * | 10/2010 | Cheng | F03D 3/002 |
| | | | | 416/1 |
| 2011/0081243 A1 | * | 4/2011 | Sullivan | F03D 3/002 |
| | | | | 416/120 |

* cited by examiner

ROTOR BLADE FOR VERTICAL AXIS WIND TURBINE

CROSS-REFERENCE TO RELATED APPLICATION

This Application is a Section 371 National Stage Application of International Application No. PCT/US2011/038085, filed May 26, 2011 and published as WO2011/150171 A2 on Dec. 1, 2011, in English, and claims the benefit of U.S. Provisional Application Ser. No. 61/348,945, filed May 27, 2010, U.S. Provisional Application Ser. No. 61/414,658, filed Nov. 17, 2010, and U.S. Provisional Application Ser. No. 61/414,662, filed Nov. 17, 2010, under 35 U.S.C. §119(e). Each of the above-referenced applications are hereby incorporated by reference in their entirety.

FIELD OF THE INVENTION

Embodiments of the present invention are directed to rotor blades for use in a vertical axis wind turbine, and, more specifically, to a vented rotor blade for use in a Savonius type vertical axis wind turbine.

BACKGROUND

There are two basic types of vertical axis wind turbines: Savonius wind turbines and Darrieus wind turbines. A Savonius system utilizes aerodynamic drag forces creating high torque at low rotation speeds. A Darrieus system uses aerodynamic lift forces to rotate at high speeds. The Savonius type vertical axis wind turbine utilizes opposing rotor blades that are attached to a rotatable shaft. The rotor blades each have a wind-capturing side and a wind-deflecting side. The rotor blades operate to rotate the shaft due to differences in the drag forces on the wind-capturing and wind-deflecting sides of the opposing rotor blades.

Savonius type rotor blades have been designed such that the wind-capturing side deflects or redirects the wind toward the capturing side of the opposing rotor blade. This generally involves an airflow path that travels radially either through or near the central shaft. Examples of such Savonius type rotor blades are disclosed in U.S. Pat. Nos. 5,494,407 and 7,008,171.

SUMMARY

Embodiments of the invention are directed to a rotor blade for use in a vertical axis wind turbine. In one embodiment, the rotor blade comprises a central portion having a central axis and at least two blade members. The blade members each have a proximal end attached to the central portion, a high drag side and a low drag side that is opposite the high drag side. Each of the blade members also includes an uncovered vent comprising an opening through the blade member that provides an unobstructed path for airflow through the blade member. In one embodiment, a pair of fins are positioned adjacent the opening of the vent and extend from the high drag side of the blade member. In accordance with some embodiments, the opening comprises sides that are tapered at angles that converge toward a point on the high drag side. In one embodiment, the vent comprises a pair of fins adjacent the opening, each fin extends from the high drag side of the blade. In one embodiment, the fins are tapered at angles that converge toward a point on the high drag side. In accordance with some embodiments, the blade member comprises a planer section and a curved section. The planer section has a proximal end attached to the central portion. The curved section is located distally from the planer section and has a concave side corresponding to the high drag side. In one embodiment, the opening is in the planer section. In accordance with some embodiments, the blade member has a length (L) that is measured radially from the central axis to a distal end of the blade member. In one embodiment, the vent is displaced from the central axis a distance that is greater than or equal to ¼L, ⅓L, ½L, or ¾L. In one embodiment, the blade member comprises a curved section having a radius of curvature (R). In one embodiment, the ratio of L/R has a range of 2-4. In one embodiment, the curved section has an arc length of greater than or equal to 90 degrees or 110 degrees. In accordance with some embodiments, the opening is elongated in the directed of the central axis. In accordance with some embodiments, the blade member has a height (H) measured in the direction of the central axis. In one embodiment, the opening of the vent has a length ($L_V$) measured in the direction of the central axis that is greater than or equal to ½H, ¾H, or ⅘H. In one embodiment, the blade member comprises a curved section comprising an arc. In one embodiment, the rotor blade further comprises first and second blade caps each oriented perpendicularly to the central axis. The first blade cap is attached to a top side of the curved section and extends across the arc of the curved section. The second blade cap is attached to a bottom side of the curved section and extends across the arc.

Some embodiments of the invention are directed to a rotor blade for use in a vertical axis wind turbine that comprises a central portion having a central axis and at least two blade members attached to the central portion. The two blade members extend from the central portion and each comprises a high drag side, a low drag side that is opposite the high drag side, an uncovered vent comprising an opening through the blade member, and a pair of fins adjacent the opening extending from the high drag side of the blade member. In one embodiment, the fins are tapered at angles that converge toward a point on the high drag side. In one embodiment, the opening provides an unobstructed path for air flow through the blade member. In one embodiment, the blade member comprises a planer section and curved section, the planer section having a proximal end attached to the central portion, the curved section is located distally from the planer section and has a concave side that corresponds to the high drag side. In one embodiment, the blade member has a length (L) that is measured radially from the central axis to a distal end of the blade member. In one embodiment, the vent is displaced from the central axis a distance of greater than or equal to ¼L, ⅓L, ½L, or ¾L. In one embodiment, the blade member comprises a curved section having a radius of curvature (R). In one embodiment, the ratio of L/R has a range of 2-4. In one embodiment, the opening is elongated in the directed of the central axis. In one embodiment, the blade member comprises a curved section comprising an arc. In one embodiment, the rotor blade further comprises first and second blade caps each oriented perpendicularly to the central axis. The first blade cap is attached to a top side of the curved section and extends across the arc of the curved section. The second blade cap is attached to a bottom side of the curved section and extends across the arc.

Some embodiments are directed to a rotor blade for use in a vertical axis wind turbine, wherein the rotor blade comprises a central portion, first and second blade members, and top and bottom blade caps. The central portion has a central axis. The first and second blade members are attached to the central portion. Each of the blade members comprises a distal edge that is radially displaced from the central axis, a top edge, a bottom edge displaced from the top edge along the central axis, a high drag side and a low drag side that is opposite the high drag side. The top and bottom blade caps are respectively attached to the top and bottom edges of the first blade member. Each blade cap comprises a first portion and a second portion. The first portion extends from the first blade member to a blade line, which extends radially from the central axis to the distal edge of the first blade member. The second portion extends from the first portion at the blade line, the second portion has a trailing edge that is angularly displaced about the central axis from the blade line and the second blade member. In some embodiments, the blade members each comprise a planer section and a curved section. The planer section has a proximal end attached to the central portion and a distal end attached to the curved section. The curved section has a concave side corresponding to the high drag side. In some embodiments, the trailing edge of the second portion is angularly displaced from the blade line an amount that is less than or equal to 90 degrees less a blade arc, which is the angle between the planer section and the blade line of the first blade member measured about the central axis. In one embodiment, the trailing edge of the second portion is angularly displaced from the blade line less than 90 degrees about the central axis. In some embodiments, the distal edge is located at a radial distance $R_{DE}$ from the central axis, and the second portion includes a distal edge that is radially displaced from the central axis a distance that is less than or equal to $R_{DE}$. In some embodiments, the distal edge is located at a radial distance $R_{DE}$ from the central axis, and the second portion includes a distal edge that is radially displaced from the central axis a distance that greater than or equal to $R_{DE}$. In some embodiments, a distal edge of the second portion is radially displaced a uniform distance from the central axis. In some embodiments, a distal edge of the second portion is radially displaced a variable distance from the central axis.

Other embodiments are directed to a rotor blade for use in a vertical axis wind turbine that comprises a central portion, first and second blade members, a pair of first blade cap sections and a pair of second blade cap sections. The central portion has a central axis. The first and second blade members are attached to the central portion, each blade member comprises a distal edge that is radially displaced from the central axis, a top edge, a bottom edge displaced from the top edge along the central axis, a high drag side and a low drag side that is opposite the high drag side. The pair of first blade cap sections are attached to the top and bottom edges of the first blade member. Each first blade cap section comprises a first portion and a second portion. The first portion extends from the first blade member to a first blade line, which extends radially from the central axis to the distal edge of the first blade member. The second portion extends from the first portion at the first blade line. The second portion has a trailing edge that is angularly displaced about the central axis from the first blade line and the second blade member. the pair of second blade cap sections are attached to the top and bottom edges of the second blade member and comprise a first portion and a second portion. The first portion of the second blade cap section extends from the second blade member to a second blade line, which extends radially from the central axis to the distal edge of the second blade member. The second portion of the second blade cap section extends from the first portion at the second blade line and includes a trailing edge that is angularly displaced about the central axis from the second blade line and the first blade member. In some embodiments, the blade members each comprise a planer section and a curved section. The planer section has a proximal end that is attached to the central portion and a distal end that is attached to the curved section. The curved section has a concave side corresponding to the high drag side. In some embodiments, the trailing edge of the second portion of the first pair of blade caps is angularly displaced from the first blade line an amount that is less than or equal to 90 degrees less a first blade arc, which is the angle between the planer section of the first blade member and a first blade line measured about the central axis. In some embodiments, the trailing edge of the second portion of the second pair of blade caps is angularly displaced from the second blade line an amount that is less than or equal to 90 degrees less a second blade arc, which is the angle between the planer section of the second blade member and the second blade line measured about the central axis. In some embodiments, the distal edges of the first and second blade members are each located at a radial distance $R_{DE}$ from the central axis. In some embodiments, the second portions of the first and second pair is a blade cap extend radially from the central axis a distance that is less than or equal to $R_{DE}$. In some embodiments, a distal end of the second portions of the first and second pairs of blade caps are radially displaced a uniform distance from the central axis. In some embodiments, a distal edge of the second portions of the first and second pairs of blade caps are radially displaced a variable distance from the central axis. In some embodiments, the trailing edge of the second portions of the first pair of blade caps are angularly displaced from the first blade line less than 90 degrees about the central axis. In some embodiments, the trailing edge of the second portions of the second pair of blade caps are angularly displaced from the second blade line less than 90 degrees about the central axis.

Some embodiments are directed to a rotor blade for use in a vertical axis wind turbine that comprises a central portion, a blade member, a top blade cap and a bottom blade cap. The central portion has a central axis. The blade member is attached to the central portion and comprises a distal edge that is radially displaced from the central axis, a top edge, a bottom edge displaced from the top edge along the central axis, a high drag side and a low drag side that is opposite the high drag side. The top blade cap is attached to the top edge of the blade member. The top blade cap comprises first and second portions. The first portion extends from the top edge to a top blade line, which extends radially from the central axis to an intersection of the distal edge and the top edge on the high drag side. The second portion extends from the first portion at the top blade line and has a trailing edge that is angularly displaced from the top blade line away from the low drag side of the blade member measured about the central axis. The bottom blade cap is attached to the bottom edge of the blade member. The bottom blade cap includes first and second portions. The first portion extends from the bottom edge to a top blade line, which extends radially from the central axis to an intersection of the distal edge and the bottom edge of the high drag side. The second portion extends from the first portion at the bottom blade line and has a trailing edge that is angularly displaced from the bottom blade line away from the low drag side of the blade member measured about the central axis. In some embodiments, the blade member comprises a planer section and a curved section. The planer section has a proximal end attached to the central portion and a distal end attached to the curved section. The curved section has a concave side corresponding to the high drag side. In some embodiments, the trailing edges of the second portions are angularly displaced from the top and bottom blade lines an amount that is less than or equal to 90 degrees less a blade arc, which is the angle between the planer section and the top or bottom blade lines measured about the central axis. In some embodiments, the distal edge of the blade member is located at a radial distance $R_{DE}$ from the central axis, and the second portions extend radially from the central axis a distance that is less than or equal to $R_{DE}$. In some embodiments, the trailing edge of the second portion of the top blade cap is angularly displaced from the top blade line less than 90 degrees about the central axis. In some embodiments, the trailing edge of the second portion of the bottom blade cap is angularly displaced from the bottom blade line less than 90 degrees about the central axis.

Other features and benefits that characterize embodiments of the invention will be apparent upon reading the following detailed description and review of the associated drawings.

DETAILED DESCRIPTION OF ILLUSTRATIVE EMBODIMENTS

Figure 1:
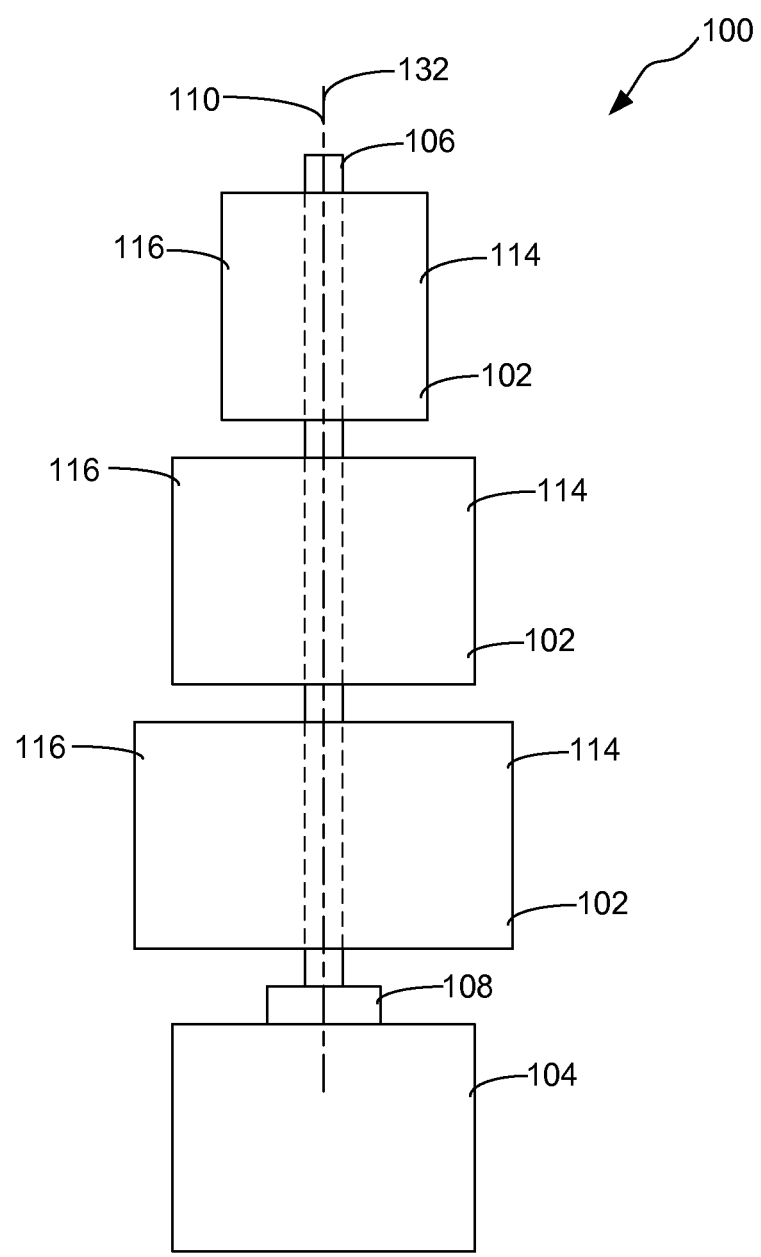
FIGS. 1 and 2 respectively are simplified front and top views of an exemplary vertical axis wind turbine that includes rotor blades formed in accordance with embodiments of the invention.
Figure 2:
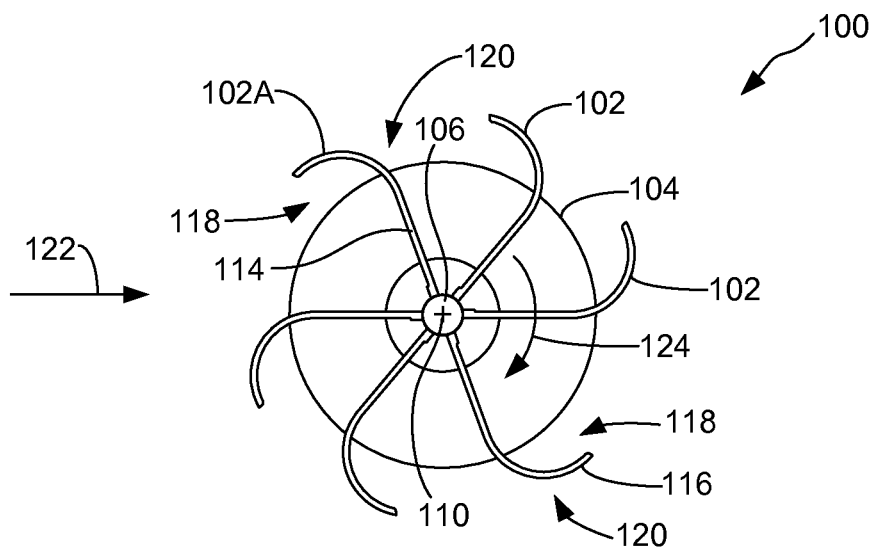

FIGS. 1 and 2 respectively are simplified front and top views of an exemplary vertical axis wind turbine 100 that includes rotor blades 102 formed in accordance with embodiments of the invention, a support structure 104, a rotatable shaft 106 and one or more bearings 108. While the exemplary vertical axis wind turbine 100 is shown to include three rotor blades, it is understood that embodiments of the invention include a vertical axis wind turbine that includes one or more rotor blades 102. The number of rotor blades 102 can be adjusted based on various factors, such as the desired power generation and the anticipated maximum wind velocity, for example.

The shaft 106 is supported for rotation about a central axis 110 by the bearing(s) 108. The rotor blades 102 are attached to the shaft 106 such that they rotate with the shaft 106 about the central axis 110. In one embodiment, the rotor blades 102 are attached to the shaft 106 at different angular orientations, as illustrated in FIG. 2.

The support structure 104 can comprise a base that provides support to the shaft 106, the bearing 108 and the rotor blades 102. The base may also house other conventional components of the wind turbine 100 that are not illustrated in FIG. 1 including, for example, a braking system, a drive generator and/or other electrical and/or mechanical system components commonly used in vertical axis wind turbines. In one embodiment, the base structure 104 includes support structures that extend horizontally from a vertical structure, such as a telecommunications tower, and supports the top and bottom portions of the shaft 106, one or more bearings 108, and the one or more blades 102.

In one embodiment, the blades 102 each comprise first and second opposing blade members 114 and 116. In one embodiment the blade members 114 and 116 each comprise a high drag side 118 and a low drag side 120, which is opposite the high drag side 118, as shown in FIG. 2. Both the first and second blade members 114 and 116 position the sides 118 and 120 such that they face in the same angular direction.

When the blade members 102 are positioned in a wind moving in the direction indicated by arrow 122, drag forces are simultaneously applied against both the first and second blade members 118 and 120 of, for instance, rotor blade 102A. The high drag side 118 is less aerodynamic than the low drag side 120 resulting in a greater drag force being applied to the blade member 114 than the blade member 116. The difference between these drag forces results in a net torque on the rotor blade 102A that drives rotation of the rotor blade 102A and the attached shaft 106 in the direction indicated by arrow 124. This rotation of the shaft 106 can be used, for example, to drive a generator to produce electrical energy.

Figure 6:
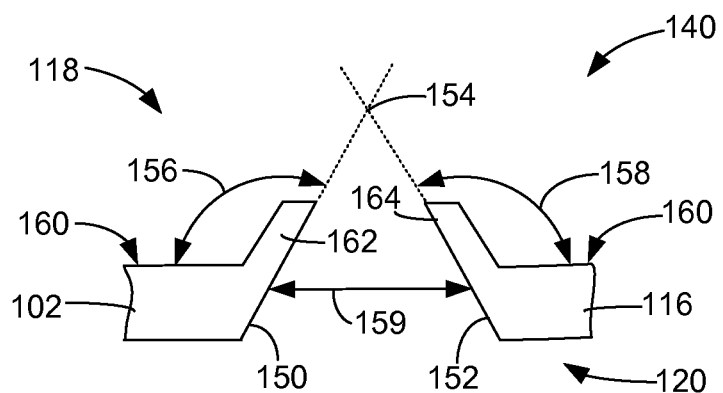
FIG. 6 is a top plan view of a rotor blade in accordance with embodiments of the invention.
Figure 3:
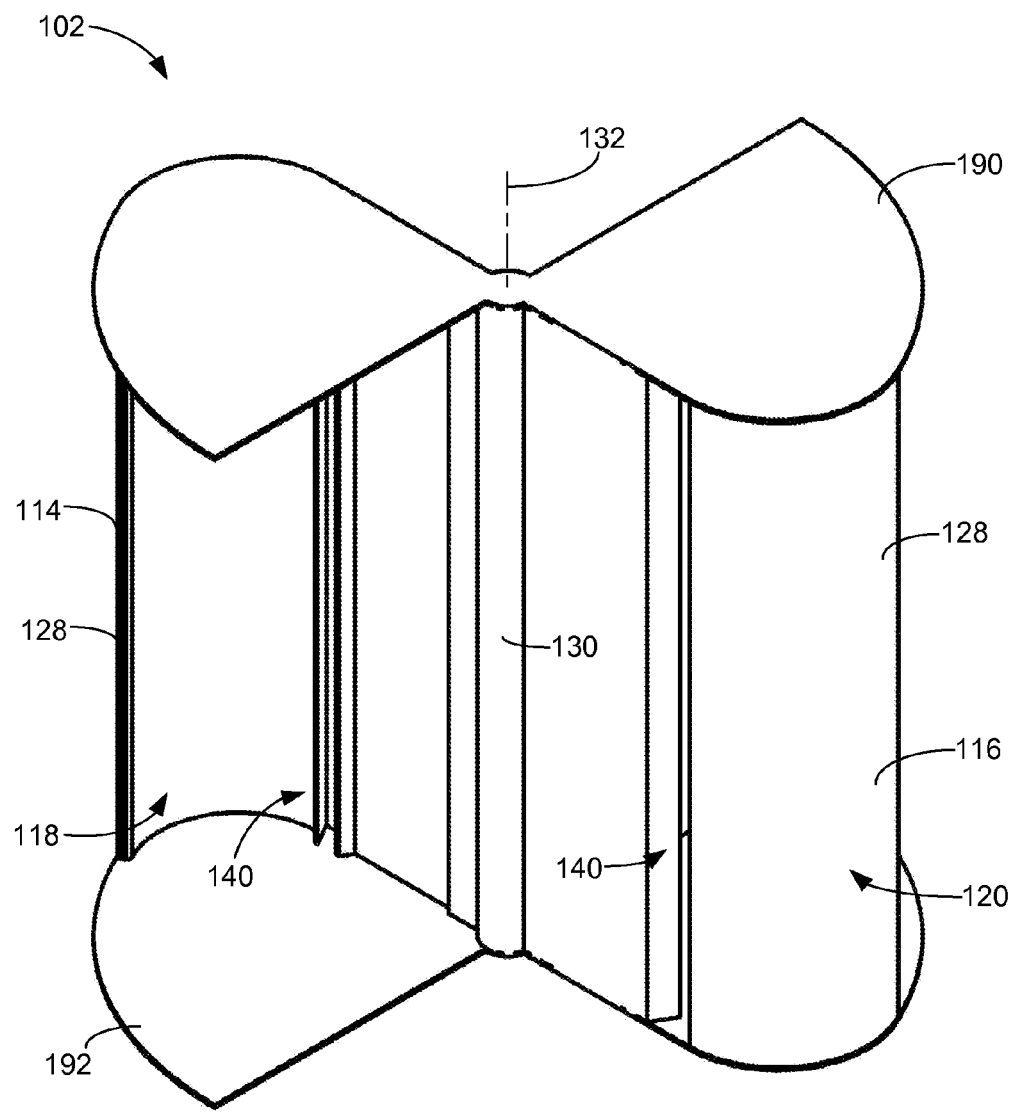
FIG. 3 is an isometric view of a rotor blade in accordance with embodiments of the invention.
Figure 4:
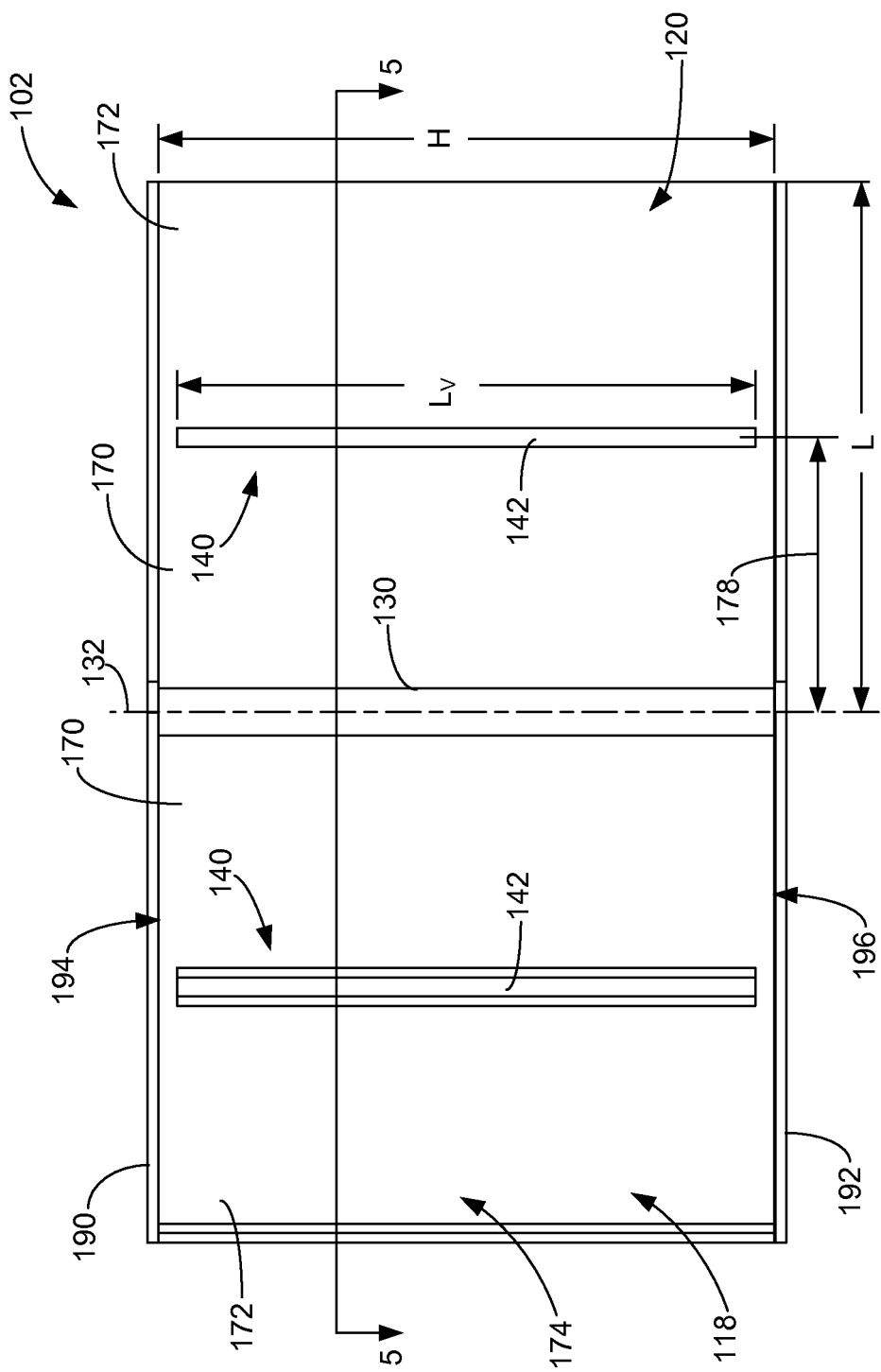
FIG. 4 is a front view of a rotor blade formed in accordance with embodiments of the invention.
Figure 5:
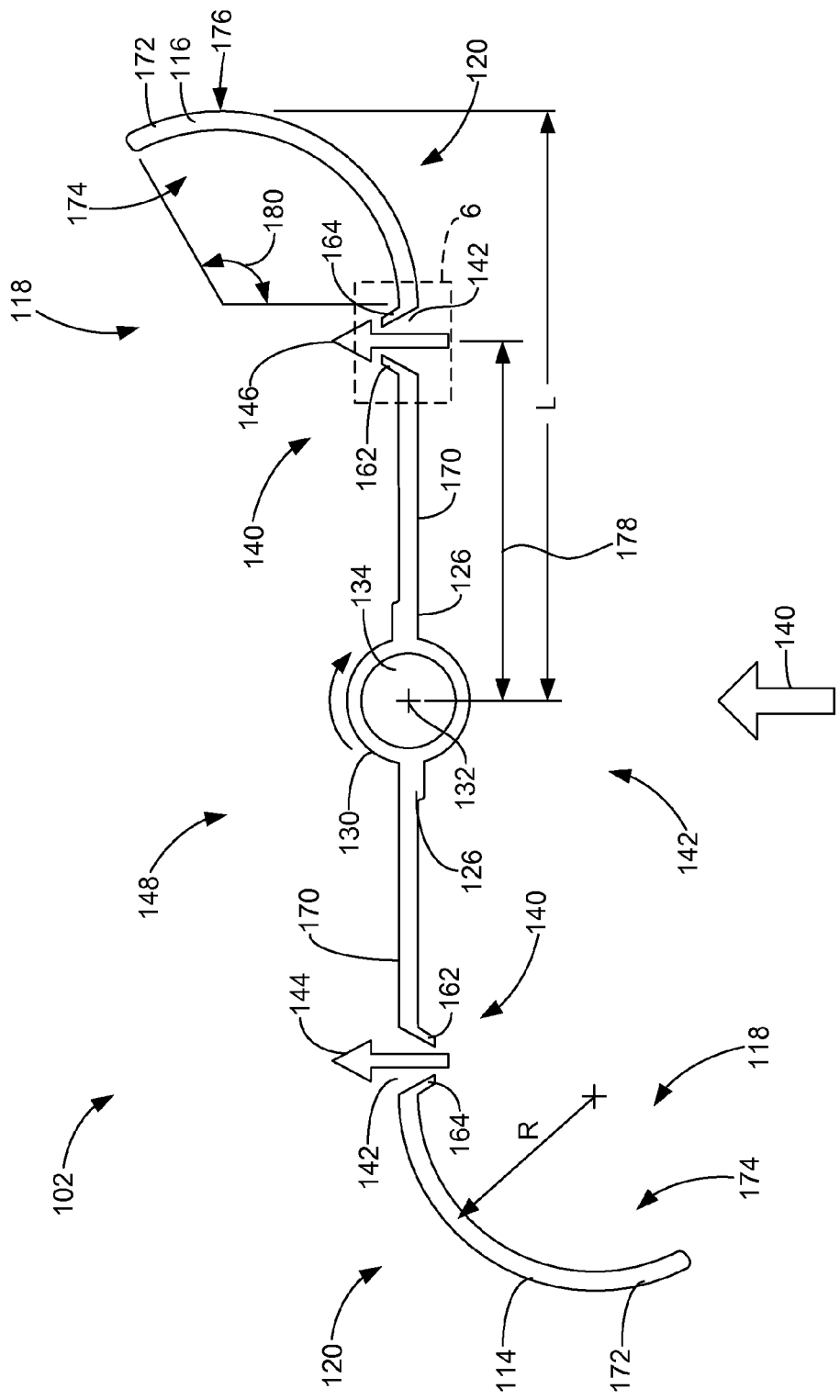
FIG. 5 is a cross-sectional view of the rotor blade of FIG. 4 taken generally along the line 5-5.

FIGS. 3-5 illustrate additional embodiments of the rotor blade 102. FIG. 3 is an isometric view of a rotor blade 102 in accordance with embodiments of the invention. FIG. 4 is a front view of a rotor blade 102 formed in accordance with embodiments of the invention. FIG. 5 is a cross-sectional view of the rotor blade of FIG. 4 taken generally along the line 5-5. An optional bottom blade cap is not shown in FIG. 5 in order to simplify the illustration. FIG. 6 is a top plan view of the rotor blade 102 in accordance with embodiments of the invention.

The blade 102 may be formed as a single integral unit through, for instance, an injection molding process. Alternatively, the rotor blade 102 may be assembled from multiple pieces using adhesive, rivets, bolts, and/or other suitable fasteners. Thus, while the discussion provided below identifies various portions of the blade 102, it is understood that the identified portions may be integrally formed with other identified portions of the blade 102, and/or the identified portions may be formed through the assembly of two or more components of the blade 102.

The blade 102 may be formed of polypropylene having, for example, 2-3% foam, or other suitable material. A softener may be added to minimize warpage of the structure. An ultraviolet protectant may also be added to the material forming the blade 102 or applied to the surfaces of the blade 102. In one embodiment, the rotor blade 102 has a thickness of approximately 0.25 inches, however, other thicknesses may be used. In one embodiment, a honeycomb internal structure is used to increase rigidity of the rotor blade 102.

One embodiment of the rotor blade 102 comprises a central portion 130 that is configured to receive or attach to a rotatable shaft of a vertical axis wind turbine, such as shaft 106 of the exemplary wind turbine 100 shown in FIG. 1. The first and second blade members 114 and 116 each comprise a proximal end 126 that is attached to the central portion 130 and a distal end 128 that extends generally in a radial direction from the central portion 130.

The central portion 130 includes a central axis 132 that corresponds to the axis of rotation (e.g., 110) of the shaft 106 of the vertical axis wind turbine when the central portion 130 is attached to the shaft, as illustrated in FIG. 1. In one embodiment, the central portion 130 includes a bore 134 that is configured to receive the shaft 106 or a portion thereof. In one embodiment, the bore 134 comprises a non-circular shape that matches a non-circular cross-sectional shape of the shaft 106. For instance, the shaft 106 and the bore 134 may comprise a square, hexagonal, or other cross-sectional shape. The bore 134 preferably substantially conforms to the exterior shape of the shaft 106 to ensure that the blade 102 and the shaft 106 rotate as a unit. Other techniques may also be used to attach the rotor blade 102 to the shaft 106, such as through the use of a hub, bolts or pins passing through both the central portion 130 and the shaft 106, or other suitable techniques.

In one embodiment, each of the blade members 114 and 116 includes a vent 140, as best shown in FIGS. 4 and 5. In accordance with another embodiment, the blade members 114 and 116 comprise a plurality of vents 140. In one embodiment, the vent 140 includes an opening 142 that provides an unobstructed path for airflow through the blade member. In one embodiment, the width 159 of the opening 142 is in a range of 3-6 inches.

In one embodiment, the opening 142 of the vent 140 provides an unobstructed path for an airflow traveling from the high drag side 118 to the low drag side 120, and for an airflow traveling from the low drag side 120 to the high drag side 118. For instance, when the blade 102 is placed in an airflow (i.e., wind) represented by arrow 140, pressure generated on the upstream side 142 of the blade members 114 and 116 will produce an airflow 144 through the blade member 114 and an airflow 146 through the blade member 116 that travel from the high pressure upstream side 142 to the low pressure downstream side 148, as illustrated in FIG. 5. In other words, a portion of 144 of the airflow 140 is allowed to pass through the opening 142 of the vent 140 in the blade member 114 and another portion 146 of the airflow 140 is allowed to pass through the opening 142 of the vent 140 in the blade member 116.

As mentioned above, the airflows 144 and 146 are unobstructed as they pass through the vents 140 from the high pressure upstream side 142 to the low pressure downstream side 148 of the blade members 114 and 116. In one embodiment, the unobstructed path through the vent 140 is one that is not hindered by structure of the rotor blade 102. In one embodiment, the vents 140 do not include covers or flaps that move between open and closed positions, such as described in U.S. Pat. No. 7,696,635 or U.S. Publication number 2004/0057829. In accordance with another embodiment, the rotor blade 102 or the blade members 114 and 116 do not include sections that deflect the airflow portions 144 and 146 toward the opposing blade member or the central axis 132, as discussed in U.S. Pat. No. 7,008,171 and U.S. Pat. No. 4,177,009, for example. Rather, the rotor blade 102 does not include a structure that prevents the airflow portions 144 and 146 from traveling through the vents 140 in the downstream direction, as illustrated in FIG. 5.

In one embodiment, the opening 142 of the vent 140 comprises tapered sides 150 and 152 that converge toward a point 154 on the high drag side 118 of the rotor blade 102, as illustrated in FIG. 6, which is a magnified view of the portion within box 6 of FIG. 5. That is, if the sides 150 and 152 were extended, they would converge on the high drag side 118 of the corresponding blade member. In one embodiment, the sides 150 and 152 are respectively oriented at angles 156 and 158 relative to the surface 160 on the high drag side 118 of the blade member. In one embodiment, the angles 156 and 158 are within a range of 110-145°.

One embodiment of the vents 140 comprise a pair of fins 162 and 164 that are positioned adjacent the opening 142 and extend from the high drag side 118 of the blade member 114 or 116, as shown in FIGS. 5 and 6. In one embodiment, the fins 162 and 164 are respectively tapered at angles 156 and 158 from the surface 160 that converge toward a point 154 on the high drag side 118, as shown in FIG. 6. That is, if the fins 162 and 164 were extended, they would converge on the high drag side 118 of the corresponding blade member.

In one embodiment, each blade member 114 and 116 comprises a planar section 170 and a curved section 172. The planar section includes the proximal end 126 that is attached to the central portion 130. The curved section 172 is located distally from the planar section 170 and includes a concave side 174 corresponding to the high drag side 118. In one embodiment, the opening 142 of the vent 140 is formed in the planar section 170. In one embodiment, the planar section 170 is oriented tangentially to the curved section 172.

In one embodiment, each blade member 114 and 116 has a length L measured radially from the central axis 132 to a distal end 176, as shown in FIG. 5. In one embodiment, the vent 140 is displaced from the central axis a radial distance 178 along the blade member. Embodiments of the distance 178 include greater than or equal to ¼L, greater than or equal to ⅓L, greater than or equal to ½L, and greater than or equal to ¾L. In one embodiment, the distance 178 is in the range of 13-20 inches.

One embodiment of the curved section 172 comprises a semi-circular section having a radius of curvature R, as shown in FIG. 5. In one embodiment, the radius of curvature R is selected based on the length L of the blade member. In one embodiment, the ratio of L/R has a range of 2-4. In one embodiment, the radius of curvature R is approximately 8 inches and the length L is approximately 26 inches.

In one embodiment, the curved section 172 extends over an arc length 180. In one embodiment, the arc length 180 is greater than or equal to 90°. In accordance with another embodiment, the arc length 180 is greater than or equal to 110°. In one embodiment, the arch length 180 is approximately 120°.

In one embodiment, the opening 142 of the vent 140 is elongated in the direction of the central axis 132, as shown in FIG. 4. In one embodiment, each vent 140 has a rectangular shape, as illustrated in FIG. 4. In other embodiments the shape of the vent 140 include circular, oval, square or other shape.

In one embodiment, the each blade member 114 and 116 has a height H measured in the direction of the central axis 132. In one embodiment, the opening 142 of the vent 140 has a length $L_V$ that is measured in the direction of the central axis. In one embodiment, the length $L_V$ of the opening 142 is equal to the height H of the corresponding blade member. In accordance with this embodiment, a structure, such as a pair of blade caps, connect the proximal and distal portions of each of the blade members 114 and 116 together.

In accordance with other embodiments, the length $L_V$ of the opening 142 of the vent 140 is greater than or equal to ½H greater than or equal to ¾H and greater than or equal to ⅘ H. In one embodiment, the height H is approximately 36 inches. In one embodiment, the length $L_V$ is greater than 18 inches.

In accordance with another embodiment, the rotor blade 102 comprises top and bottom caps 190 and 192 that are respectively attached to a top edge 194 and a bottom edge 196 of the blade members 114 and 116, as illustrated in FIGS. 3 and 4. In one embodiment, the blade caps 190 and 192 are identical and are oriented at the same angular position about the central axis 132, as shown in FIG. 3.

Figure 7:
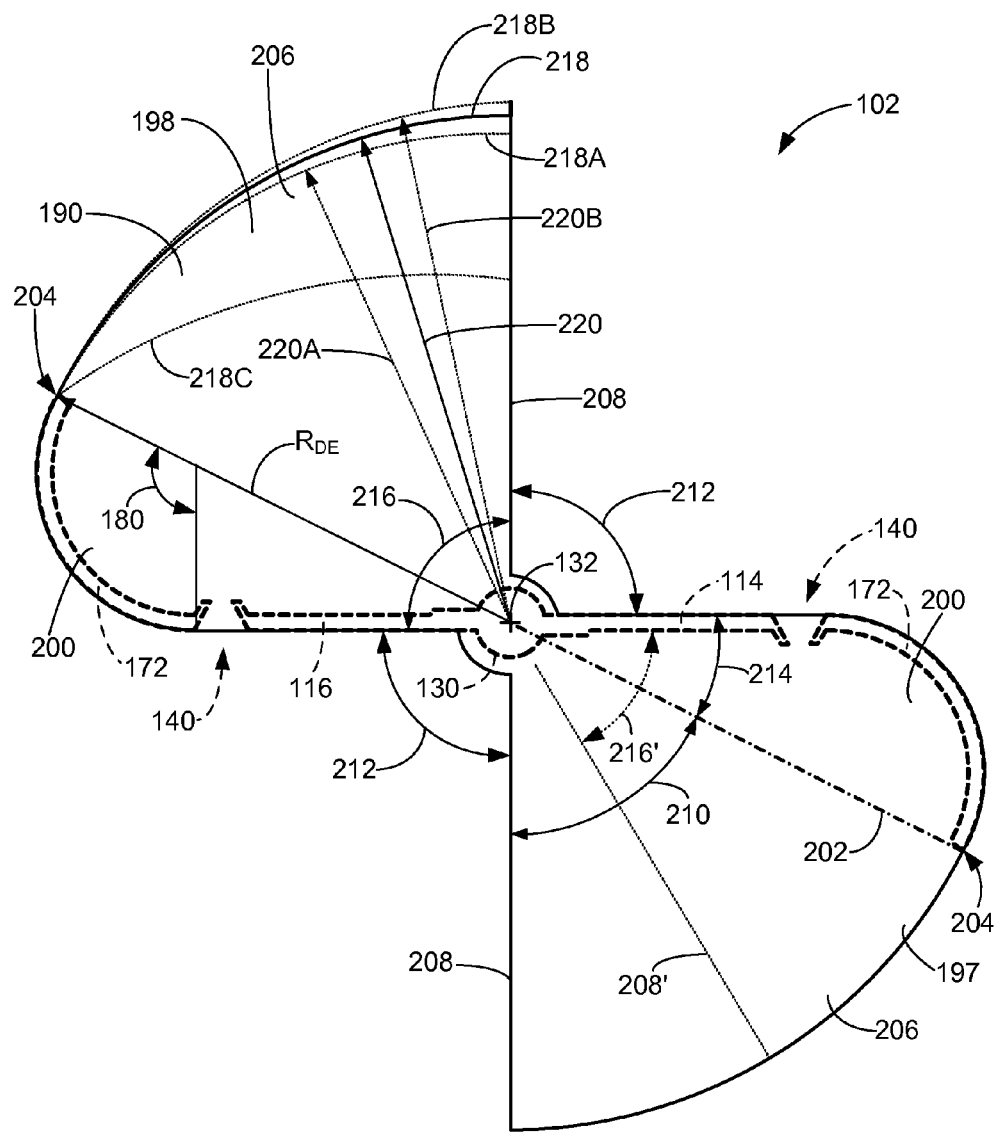
FIG. 7 is a top view of a rotor blade in accordance with embodiments of the invention.

A detailed discussion of embodiments of the blade caps 190 and 192 will be provided with reference to the top blade cap 190 shown in FIG. 7, which is a top view of the rotor blade 102. In one embodiment, embodiments of the blade cap 190 are mirrored by the blade cap 192. In one embodiment, the blade caps 190 and 192 each include substantially symmetrical sections 197 and 198 that are attached to the blade members 114 and 116. Thus, embodiments of the blade cap 192 include the embodiments of the blade cap 190 described herein, and embodiments of the sections 197 or 198 include the embodiments of the other of sections 197 and 198 described herein.

In one embodiment, the sections 197 and 198 of the blade cap 190 extend from the corresponding blade members 114 and 116 and across the arc 180 of the curved section 172, as shown in FIG. 7.

In one embodiment, each section 197 and 198 of the blade cap 190 comprises a first portion 200 that extends from the corresponding blade member 114 or 116 to a blade line 202. The blade line 202 is an imaginary line extending radially from the central axis 132 to a distal edge 204.

In one embodiment, the first and second sections 197 and 198 of the blade cap 190 each include a second portion 206 that extends from the first portion 200 at the blade line 202. The second portion 206 comprises a trailing edge 208 that is angularly displaced about the central axis 132 from the blade line 202 by an angle 210. In one embodiment, the trailing edge 208 of the section 197 is angularly displaced about the central axis 132 from the blade member 116 by an angle 212. Likewise, the trailing edge 208 of the section 198 is angularly displaced about the central axis 132 from the blade member 114 by the angle 212.

In one embodiment, the trailing edge 208 is angularly displaced about the central axis 132 from the blade line 202 an amount that is less than or equal to 90° less a blade arc 214, which is the angle between the planar member or section 170 and the blade line 202 measured about the central axis 132. Accordingly, when the planar section 170 extends radially from the central axis 132, the angle 212 is greater than or equal to 90°, in accordance with one embodiment of the invention. FIG. 7 also illustrates an exemplary trailing edge 208' (shown in phantom), in accordance with another embodiment, that is angularly displaced from the planar member 170 of the section 197 by an angle 216' that is less than 90°.

In one embodiment, the distal edge 204 of the blade members 114 and 116 is located at a radial distance $R_{DE}$ from the central axis 132. In one embodiment the second portion 206 of the sections 197 and 198 of the blade cap 190 has a distal edge 218 that is radially displaced from the central axis 132 a distance 220 that is approximately equal to the distance $R_{DE}$. In accordance with another embodiment, the second portion 206 has a distal edge 218A (shown in phantom) that is displaced from the central axis 132 a distance 220A that is less than the distance $R_{DE}$. In accordance with another embodiment, the second portion 206 has a distal edge 218B (shown in phantom) that is displaced from the central axis 132 by a distance 220B that is greater than $R_{DE}$. Thus, the distance 220 that the distal edge 218 of the second portion 206 is radially displaced from the central axis 132 may be equal to, less than, or greater than the distance $R_{DE}$ that the distal edge 204 is radially displaced from the central axis 132.

In one embodiment, the distance 220 that the distal edge 218 of the second portion 206 is radially displaced from the central axis 132 is substantially continuous, as illustrated by the distal edge 218 and the exemplary distal edges 218A and 218B. In accordance with another embodiment, the second portion 206 has a distal edge 218C (shown in phantom) that is displaced a variable radial distance from the central axis 132.

Although the present invention has been described with reference to preferred embodiments, workers skilled in the art will recognize that changes may be made in form and detail without departing from the spirit and scope of the invention.

What is claimed is:

1. A rotor blade for use in a vertical axis wind turbine comprising:
   a central portion having a central axis;
   at least two blade members attached to the central portion and extending from the central portion, each blade member comprising:
   a high drag side;
   a low drag side that is opposite the high drag side;
   an uncovered vent comprising an opening through the blade member;
   a pair of fins adjacent the opening and extending from the high drag side of the blade member; and
   a planar section and a curved section, the planar section having a proximal end attached to the central portion, the curved section located distally from the planar section and having a concave side corresponding to the high drag side.

2. The rotor blade of claim 1, wherein the fins are tapered at angles that converge toward a point on the high drag side.

3. The rotor blade of claim 1, wherein the opening provides an unobstructed path for airflow through the blade member.

4. The rotor blade of claim 1, wherein:
   the blade member has a length (L) measured radially from the central axis to a distal end of the blade member; and
   the vent is displaced from the central axis a distance selected from the group consisting of greater than or equal to ¼L, greater than or equal to ⅓L, greater than or equal to ½L, and greater than or equal to ¾L.

5. The rotor blade of claim 4, wherein:
   the curved section of each blade member has a radius of curvature (R); and
   the ratio of L/R has a range of 2-4.

6. The rotor blade of claim 1, wherein the opening is elongated in the direction of the central axis.

7. The rotor blade of claim 6, wherein:
   the curved section of each blade member includes an arc; and
   the rotor blade further comprises first and second blade caps each oriented perpendicularly to the central axis, wherein the first blade cap is attached to a top side of the curved section and extends across the arc of the curved section, and the second blade cap is attached to a bottom side of the curved section and extends across the arc.

8. A rotor blade for use in a vertical axis wind turbine comprising:
   a central portion having a central axis;
   at least two blade members attached to the central portion and extending from the central portion, each blade member comprising:
   a high drag side;
   a low drag side that is opposite the high drag side;
   an uncovered vent comprising an opening through the blade member; and a pair of fins adjacent the opening and extending from the high drag side of the blade member;

wherein:

the blade member has a length (L) measured radially from the central axis to a distal end of the blade member;

the vent is displaced from the central axis a distance selected from the group consisting of greater than or equal to ¼L, greater than or equal to ⅓L, greater than or equal to ½L, and greater than or equal to ¾L;

each blade member includes a curved section having a radius of curvature (R); and the ratio of L/R has a range of 2-4.

9. The rotor blade of claim 8, wherein the fins are tapered at angles that converge toward a point on the high drag side.

10. The rotor blade of claim 8, wherein the opening provides an unobstructed path for airflow through the blade member.

11. The rotor blade of claim 8, wherein each blade member comprises a planar section, the planar section having a proximal end attached to the central portion, the curved section located distally from the planar section and having a concave side corresponding to the high drag side.

12. The rotor blade of claim 8, wherein the opening is elongated in the direction of the central axis.

13. The rotor blade of claim 12, wherein:

the curved section of each blade member includes an arc; and the rotor blade further comprises first and second blade caps each oriented perpendicularly to the central axis, wherein the first blade cap is attached to a top side of the curved section and extends across the arc of the curved section, and the second blade cap is attached to a bottom side of the curved section and extends across the arc.

14. A rotor blade for use in a vertical axis wind turbine comprising:

a central portion having a central axis;

at least two blade members attached to the central portion and extending from the central portion, each blade member comprising:

a high drag side;

a low drag side that is opposite the high drag side;

an uncovered vent comprising an opening through the blade member; and a pair of fins adjacent the opening and extending from the high drag side of the blade member;

wherein:

the opening is elongated in the direction of the central axis;

each blade member comprises a curved section including an arc; and the rotor blade further comprises first and second blade caps each oriented perpendicularly to the central axis, wherein the first blade cap is attached to a top side of the curved section and extends across the arc of the curved section, and the second blade cap is attached to a bottom side of the curved section and extends across the arc.

15. The rotor blade of claim 14, wherein the fins are tapered at angles that converge toward a point on the high drag side.

16. The rotor blade of claim 14, wherein the opening provides an unobstructed path for airflow through the blade member.

17. The rotor blade of claim 14, wherein each blade member comprises a planar section, the planar section having a proximal end attached to the central portion, the curved section located distally from the planar section and having a concave side corresponding to the high drag side.

18. The rotor blade of claim 14, wherein:

the blade member has a length (L) measured radially from the central axis to a distal end of the blade member; and the vent is displaced from the central axis a distance selected from the group consisting of greater than or equal to ¼L, greater than or equal to ⅓L, greater than or equal to ½L, and greater than or equal to ¾L.

19. The rotor blade of claim 18, wherein:

the curved section of each blade member has a radius of curvature (R); and the ratio of L/R has a range of 2-4.

* * * * *